Patented Feb. 13, 1934

1,946,479

UNITED STATES PATENT OFFICE 1,946,479

NITROCELLULOSE COATING COMPOSITION CONTAINING AN ACID BODY

Theodore F. Bradley, Westfield, N. J., assignor to Ellis-Foster Company, Montclair, N. J., a corporation of New Jersey No Drawing. Application May 7, 1927
Serial No. 189,739

5 Claims. (Cl. 134—79)

This invention relates to plasticized nitrocellulose coating compositions adapted for use as lacquers, enamels, for making various sorts of films, and relates especially to a composition containing a non-volatile plasticizing organic acid.

The use of the non-volatile or higher fatty acids as softening agents for nitrocellulose lacquers has been disclosed in my copending patent application Serial No. 692,437.

The present application is a continuation in part of the above application and deals with various organic acids which have been found to exert softening action on nitrocellulose films. While it has been generally believed that acids are harmful to nitrocellulose coatings or films, this seems to be of serious detriment only when the nitrocellulose is present in thick blocks, or otherwise in mass; or the acid is a strong mineral one. Besides the higher fatty acids, it is observed that certain organic acids and their anhydrides, particularly phthalic and benzoic acids, possess a plasticizing or softening action in thin nitrocellulose films. This becomes apparent under certain conditions, substantially as hereinafter illustrated.

For example 10 parts by weight phthalic anhydride are dissolved with 10 parts by weight tricresyl phosphate and 10 parts by weight low viscosity nitrocellulose in 25 parts by weight butyl acetate and 25 parts by weight toluol.

When this solution is applied to a surface and allowed to dry by evaporation, a clear and plastic film is obtained. Comparative tests without any phthalic anhydride will show that the phthalic anhydride has contributed a softening or plasticizing action additional to that of the tricresyl phosphate. The presence of an ordinary type of plasticizer such as tricresyl phosphate or dibutyl phthalate seems to be necessary to prevent this acid anhydride from crystallizing.

Thus, in order to secure the most effective plasticizing action, the acid should be used in conjunction with an ordinary plasticizer, or other means must be resorted to to obtain the same effect.

Another type of plasticized film may be made as follows:

For example 10 parts by weight of benzoic acid are dissolved with 8 parts by weight of dibutyl phthalate and 10 parts by weight of low viscosity nitrocellulose in 25 parts by weight of secondary butyl acetate and 10 parts by weight of isopropyl alcohol and 15 parts by weight of toluol.

Still another type of plasticized, and in this case, pigmented film may be obtained by admixing 20 parts by weight of titanium oxide with 5 parts by weight of oleic acid and 5 parts by weight of benzoic acid with 10 parts by weight of low viscosity nitrocellulose, 25 parts by weight of butyl propionate, 25 parts by weight of xylol.

It should be noted that when using organic acid plasticizers, it is advisable to employ only non-basic or non-reactive types of pigments such as titanium oxide, titanox and lithopone, the use of basic pigments such as zinc oxide being somewhat detrimental, owing to the possibility of chemical action. In preparing a pigmented coating the pigment may be ground with the dissolved nitrocellulose and other ingredients in a ball mill, or by any other suitable means.

When such plasticizers are omitted, this acid has a tendency to crystallize during the evaporation of the solvents, often leading to the formation of very novel and artistic finishes. While it is sometimes desirable to obtain such unique and architectural finishes, it should be observed that under such conditions the plasticizing nature of the acid is very largely lost.

A film having this crystallized appearance may be obtained by dissolving equal weights of nitrocellulose and phthalic anhydride in an excess of a solvent comprising equal parts by weight of butyl acetate and toluol and then applying said solution to a surface of wood, metal and the like.

For the production either of plasticized or of crystal-containing films from nitrocellulose and an organic acid, various nitrocellulose solvents and diluents other than butyl acetate and toluol may be employed. All of the usual nitrocellulose solvents and diluents such as the alkyl acetates, propionates and butyrates, ketones, ethyl lactate, ethyl oxybutyrate and other hydroxy esters, glycol ethers, in admixture with benzenoid or petroleum hydrocarbons, and, in some cases, alcohols, also may be employed. It is sufficient to note that the solvent mixture will be satisfactory for plasticizing purposes if the nitrocellulose and plasticizing acid are maintained in good solution. The particular solvents employed, will, of course, be varied, as in ordinary practice, to obtain the desired drying time.

Lacquers may be prepared for applications by means of a paint brush, by spraying, flowing or dipping methods. As indicated phthalic and benzoic acids, or their anhydrides, have proved the most suitable types of plasticizing organic acids, although various other acids such as citric, tartaric, and the like, have also been found to possess some such action, and I do not therefore limit this invention to any particular plasticizing organic acid, any such acid or anhydride or mixtures of these coming within the purview of this invention. For example, a mixture of phthalic anhydride and oleic acid may be used.

All of the usual lacquer resins, pigments and plasticizing agents may be used in combination with the plasticizing organic acids to obtain compositions of suitable nature.

In many cases the plasticizing acids have a very beneficial effect upon nitrocellulose lacquers, favorably affecting the viscosity and brushing qualities and thus improving the composition.

I use the terms organic acid and acid anhydride interchangeably.

What I claim is:—

1. A lacquer composition containing nitrocellulose, a solvent therefor, phthalic anhydride and an additional crystallizable organic acid in amounts sufficient to exert a plasticizing action on the nitrocellulose.

2. A lacquer composition containing nitrocellulose, a solvent therefor, phthalic acid and oleic acid in amounts sufficient to exert a plasticizing action on the nitrocellulose.

3. A coating composition containing nitrocellulose, a solvent therefor, phthalic anhydride exerting a plasticizing action on the nitrocellulose, and a plasticizing substance for said nitrocellulose inhibiting the crystallization of the phthalic anhydride.

4. A crystallizing lacquer containing nitrocellulose, a crystallizable organic carboxylic acid in amount sufficient to yield crystals of the acid in a coating deposited from the composition, and glycol ethers.

5. A crystallizing lacquer containing nitrocellulose, a crystallizable organic carboxylic acid in amount sufficient to yield crystals of the acid in a coating deposited from the composition, and alkyl esters of lower fatty acids.

THEODORE F. BRADLEY.